United States Patent

[11] 3,633,517

| [72] | Inventor | Chung-Chin Kao |
| | | 214 Linden Lane, Princeton, N.J. 08540 |
| [21] | Appl. No. | 61,700 |
| [22] | Filed | Aug. 6, 1970 |
| [45] | Patented | Jan. 11, 1972 |

[54] AUTOMATIC EGG ROLL MACHINE
11 Claims, 10 Drawing Figs.

| [52] | U.S. Cl. | 107/1 A |
| [51] | Int. Cl. | A23g 3/00 |
| [50] | Field of Search | 107/1 R, 1 A, 4 R, 10–13, 54, 69 |

[56] References Cited

UNITED STATES PATENTS

| 2,855,867 | 10/1958 | Zeitlin | 107/1 A |
| 3,225,717 | 12/1965 | Page | 107/69 |
| 3,230,901 | 1/1966 | Zones | 107/1 R |
| 3,450,067 | 6/1969 | Kao | 107/1 R |

*Primary Examiner*—Richard J. Scanlan, Jr.
*Attorneys*—Francis D. Stephens and Hugo Huettig, Jr.

ABSTRACT: Egg rolls are machine made by supporting dough sections on flexible pads. Egg roll stuffing is placed on the dough sections, the pads then being mechanically moved to fold the dough over the stuffing. The folded section holding the stuffing is then rolled into final egg roll form.

INVENTOR
Chung-chin Kao

INVENTOR
Chung Kao

AUTOMATIC EGG ROLL MACHINE

This invention relates to an automatic egg roll making machine and is an improvement upon such a machine disclosed in my U.S. Pat. No. 3,450,067 for an "Automatic Egg Roll Machine."

Traditionally, egg rolls have been handmade by putting egg roll stuffing on a flat dough piece, folding side portions of the dough piece over the stuffing, and then rolling the piece to wrap the remaining dough piece around the stuffing. Machine made egg rolls do not reproduce this traditional shape. The egg rolls are in a ravioli shape as disclosed by Marino, U.S. Pat. No. 2,437,202, and thus are not literally rolls, or do not have dough covering the ends of the stuffing according to Shiffer, U.S. Pat. No. 3,494,303. In my U.S. Pat. NO. 3,450,067, I disclose a machine mechanically forming an egg roll according to the traditional handmade method. However, it has been found difficult to keep the dough sheet or piece from stretching or tearing during the folding and rolling of the dough piece around the stuffing. Consequently, troubles occurred in trying to keep the machine running to form the number of egg rolls per minute for which the machine was designed.

In general, these objects are obtained by using a conveyor employing a plurality of flexible rubber pads. In one form of this invention, each pad is mounted on a stainless steel plate and with each three pads forming a set. The sets are connected to make an endless conveyor belt. A sheet of dough is deposited upon the conveyor and egg roll stuffing placed thereon. The sheet with the egg roll stuffing is then cut to form an egg roll section and then the dough folded over the sides and end of the stuffing, and the section then rolled to form the egg roll in its final form.

In another form of this invention, the conveyor is a flat horizontal annular table turnable about its vertical axis and to which are fastened separate flexible rubber pads. Precut dough sections are placed on the pads, stuffing placed on the sections, dough folded over the sides and ends of the stuffing, and then the section rolled to final egg roll form.

The means by which the objects of this invention are obtained are described more fully with reference to the accompanying drawings in which.

Figure 1:
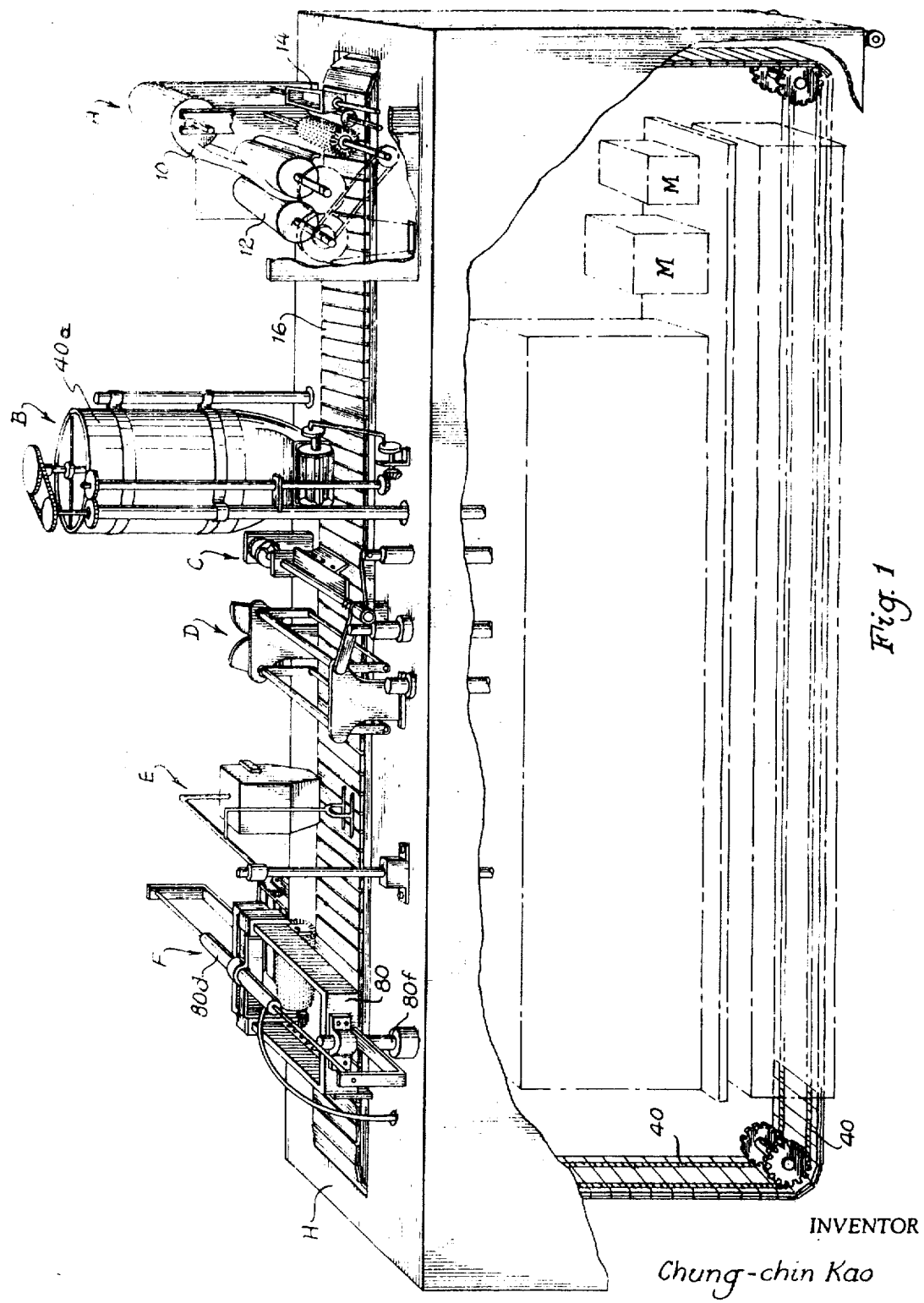
FIG. 1 is a perspective view partly in section of the egg roll machine of this invention.
Figure 2:
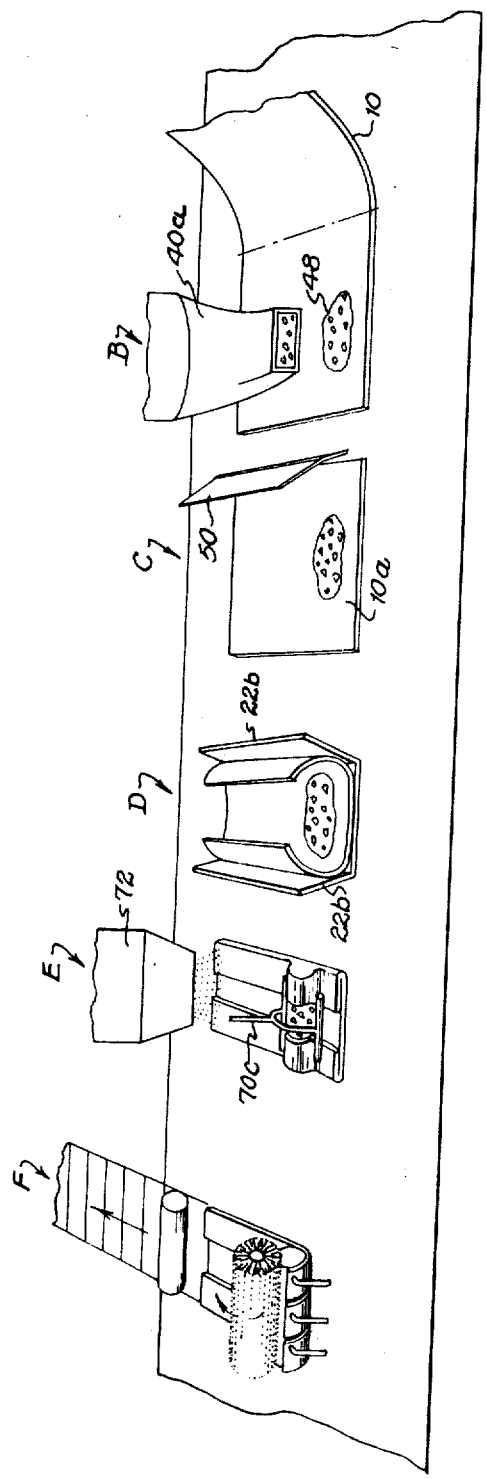
FIG. 2 is a schematic view showing the various steps used in forming the egg roll.

As shown in FIGS. 1 and 2, the machine, in general, is composed of a station A in which a sheet of dough is unrolled from a roll of dough and then is placed on an intermittently moving conveyor belt so that it is moved to an egg roll stuffing supply station B where egg roll stuffing is placed on the dough sheet, then to a cutting knife C where the dough sheet is sliced into sections, then to the first dough folding station D where the dough is partially folded over the stuffing, then to an egg roll shaping and flour or starch dusting station E, and finally to the egg roll rolling station F where the egg roll is put into its final form.

As shown in FIG. 1, at station A, a sheet of dough 10 is unwound from a roll of dough and then passed between calendaring rollers 12 where the thickness of the sheet is reduced from about 3 mm. to about 2.5 mm. which is conventional for egg rolls. A hopper and brush assembly 14 precedes the passing of a sheet of dough 10 on the conveyor 16 in order to dust the surface of the conveyor 16 with starch or flour. For purposes of clarity, the dough sheet 10 is not otherwise shown in these figures.

Figure 3:
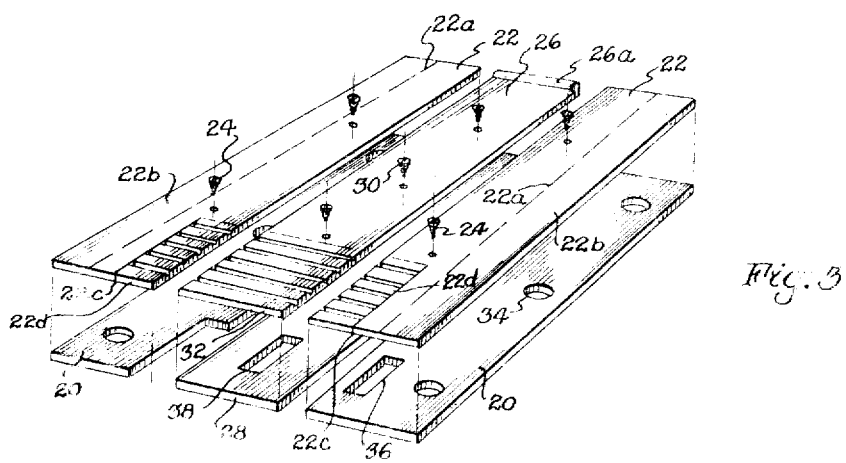
FIG. 3 is an exploded view showing the relation of a set of three rubber pads and plates forming a set part of the conveyor belt.

As shown in FIGS. 1 and 3, conveyor 16 is composed of a plurality of members, three of which form a set consisting of a center member and two side members. Each side member is composed of a stainless steel plate 20 to which are attached flexible rubber pads 22 by means of screws 24. The screws are offset inwardly of the centerline of the pad 22 so as to create a fold line 22a so that a side flap 22b is formed which can be lifted from the surface of the plate 20. Also, each pad has a slit 22c for forming an end flap 22d which is also liftable from plate 20. In the center member, the rubber pad 26 is fastened to its plate 28 by screws 30 except for an end flap 32 which is positioned between flaps 22d. On one end of pad is a rib 26a which assists in holding the dough sheet in position on the conveyor. Plate 20 is provided with openings 34, and an aperture 36 for the passage of lifting means which will be hereinafter described. Finally center plate 28 is provided with an aperture 38. These members are fastened to conveyor chains 40. As indicated in FIG. 1, suitable motor means M is provided for driving the chains and moving the endless belt across the top of the housing H.

Figure 4:
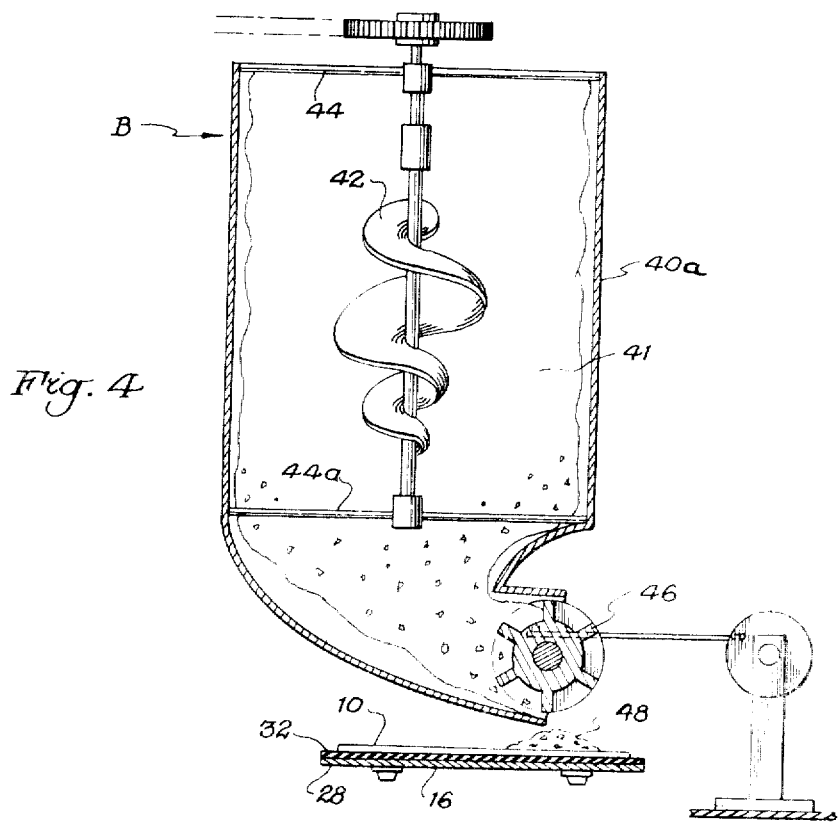
FIG. 4 is a cross-sectional view through the egg roll stuffing hopper.

The conveyor belt 16 carries the sheet of dough beneath station B. As shown in FIGS. 1 and 4, this station includes a hopper 40a open at its upper end for receiving egg roll stuffing 41. A screw conveyor 42 is mounted in the hopper by means of bars 44 and 44a for urging the stuffing down to a star-wheel valve 46 for depositing a measured portion of stuffing 48 on the dough sheet 10. This deposited stuffing is elongated in the longitudinal direction of the conveyor 16 and is adjacent to one side edge of the dough sheet 10. The length of the stuffing portion 48 is less than the length of one set of the conveyor members.

Figure 5:
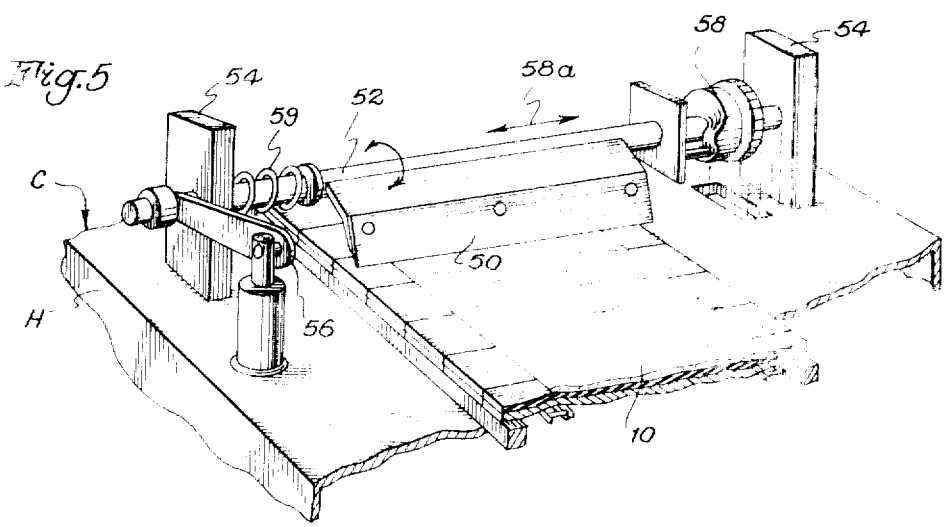
FIG. 5 is a perspective view of the dough cutting mechanism.
Figure 7:
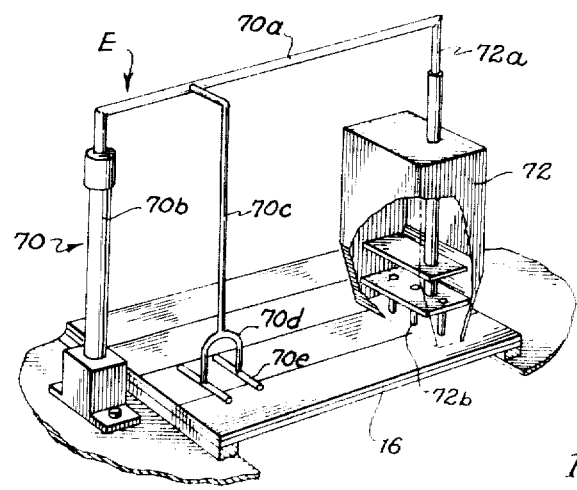
FIG. 7 is a perspective view of the egg roll shaping and starch dusting mechanism.
Figure 8:
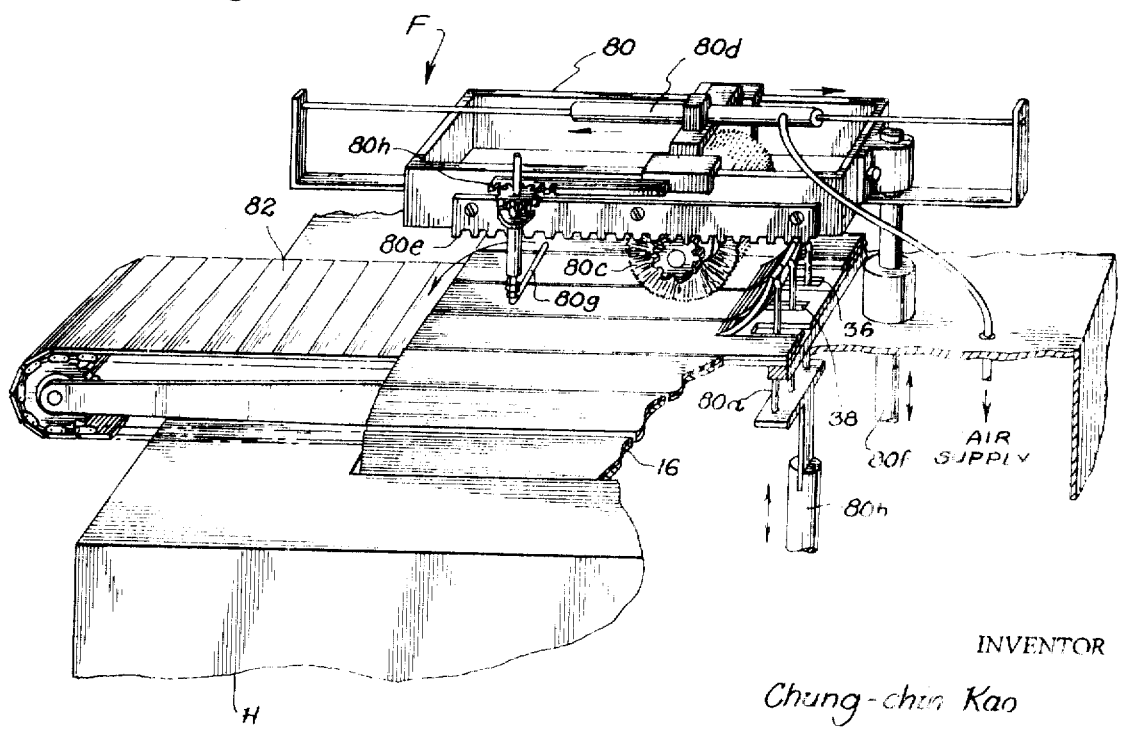
FIG. 8 is a perspective view of the final egg roll rolling mechanism.

The next intermittent movement of the conveyor brings the stuffing on the dough sheet to station C as shown in FIGS. 1 and 5. In this station, a knife blade 50 is joined to a shaft 52 supported in posts 54. This shaft is turnable by a suitably operated crank mechanism 56 so that the knife 50 can be brought down to cut a dough section 10a with the stuffing thereon from the continuous dough sheet. At the same time, a cam 58 moves the shaft longitudinally as indicated by the arrows 58a so that the knife is moved longitudinally as it cuts down through the dough sheet. A spring 59 on the opposite end of the shaft returns the knife blade to starting position when the cutting is finished and the knife 50 lifted by crank mechanism 56.

Figure 6:
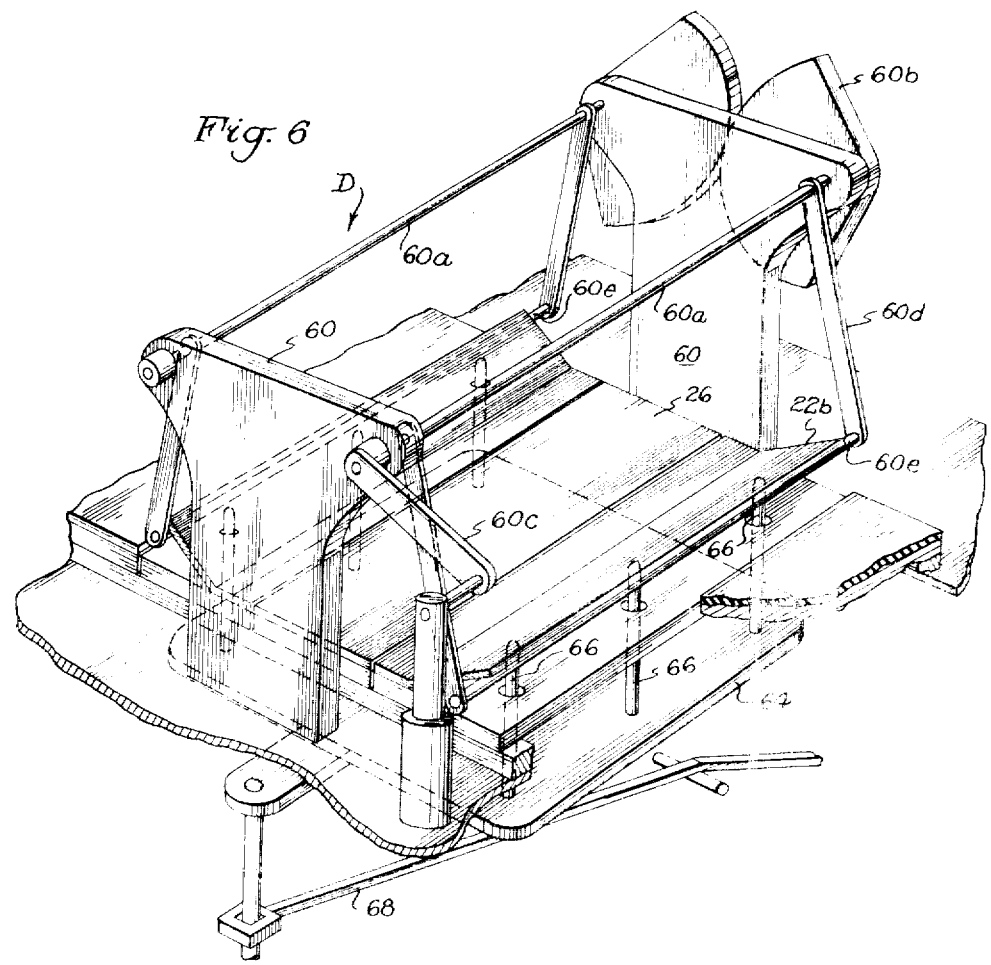
FIG. 6 is a perspective view of the first dough folding mechanism.

The next intermittent movement brings the cut section of dough to station D as shown in FIGS. 1 and 6. This station is composed of a pair of brackets 60 which support a pair of shafts 60a at one end of which are gear segments 60b. Shafts 60a are actuated by a suitable crank system 60c operated by a suitable mechanism. Shafts 60a each are connected to folding wings formed by arms 60d between which extends the rods 60e, respectively.

Beneath the conveyor 16 at this station D is a plate 64 upon which are mounted a plurality of lifting pins 66. This plate is raised and lowered by a suitably lever mechanism 68. In operation, at this station, the plate 64 is raised, thus pushing the pins 66 through the openings 34 in the plate 20, FIG. 3, to lift the side flaps 22b and thus for turning the side edges of the dough section 10a toward the center portion. As the pins retract, the shafts 60a are turned and bring rods 60e beneath the flaps 22b and turn the flaps with the dough supported thereon over onto the center portion of the dough section and on top of the stuffing portion 48 on the dough section. The pins 66, of course, normally lie beneath the plate 20 so as not to obstruct the movement of the conveyor.

The next movement of the conveyor takes the partially formed egg roll or master to station E. The stuffing with the dough flaps partially folded thereover moves beneath the fork means 70 which is composed of a horizontal bar 70a vertically movable in a stand 70b and from which depends a stem 70c at the bottom of which is a U-shaped member 70d to which are attached a pair of spaced horizontal rods 70e. As the egg roll master lies below and between the rods 70e, the rods descent along the sides of the partially dough covered stuffing and more or less shape the stuffing into form substantially semicircular in cross section. This is for the purpose of putting it into shape for the following rolling operation. At the same time, the horizontal bar 70a actuates a pump in hopper 72 by means of the vertical shaft 72a for the purpose of squirting starch or dough through nozzles 72b onto the folded over dough flaps.

The next intermittent movement of the conveyor brings the dough master to station F where the dough master becomes positioned beneath a frame 80. At this station, the first operation is for the rising of fingers 80a through the apertures 36 and 38, note FIG. 3, in the plates and in so doing lifting the flaps 22d and 32 upwardly so as to start the turning over or rolling of the egg roll. This is accomplished by a suitable lifting mechanism 80b. A brush 80c rotatably mounted in frame 80 is retracted by air cylinder 80d to be above the lifted flaps. As soon as the fingers begin to be retracted by being moved downwardly, the frame 80 drops down to engage brush 80c with the partially turned over egg roll and the air cylinder 80d is operated so as to move the brush to the left in FIG. 1. This disengages the egg roll from the flaps and as the brush 80c is rotated by moving along rack 80e, the egg roll is rolled into cylindrical form. The frame is dropped and then later raised by a suitable lifting mechanism 80f. During this rolling, the master tends to slip to the left in FIG. 1. Such is prevented by using a horizontal finger 80g mounted on frame 80 which initially presses slightly down upon the free end of the master. During the rolling, the frame 80 moves a ratchet 80h attached to the frame and this rotates finger 80g 90° and out of contact with the master. The completed egg roll is rolled onto a discharge conveyor 82.

Figure 9:
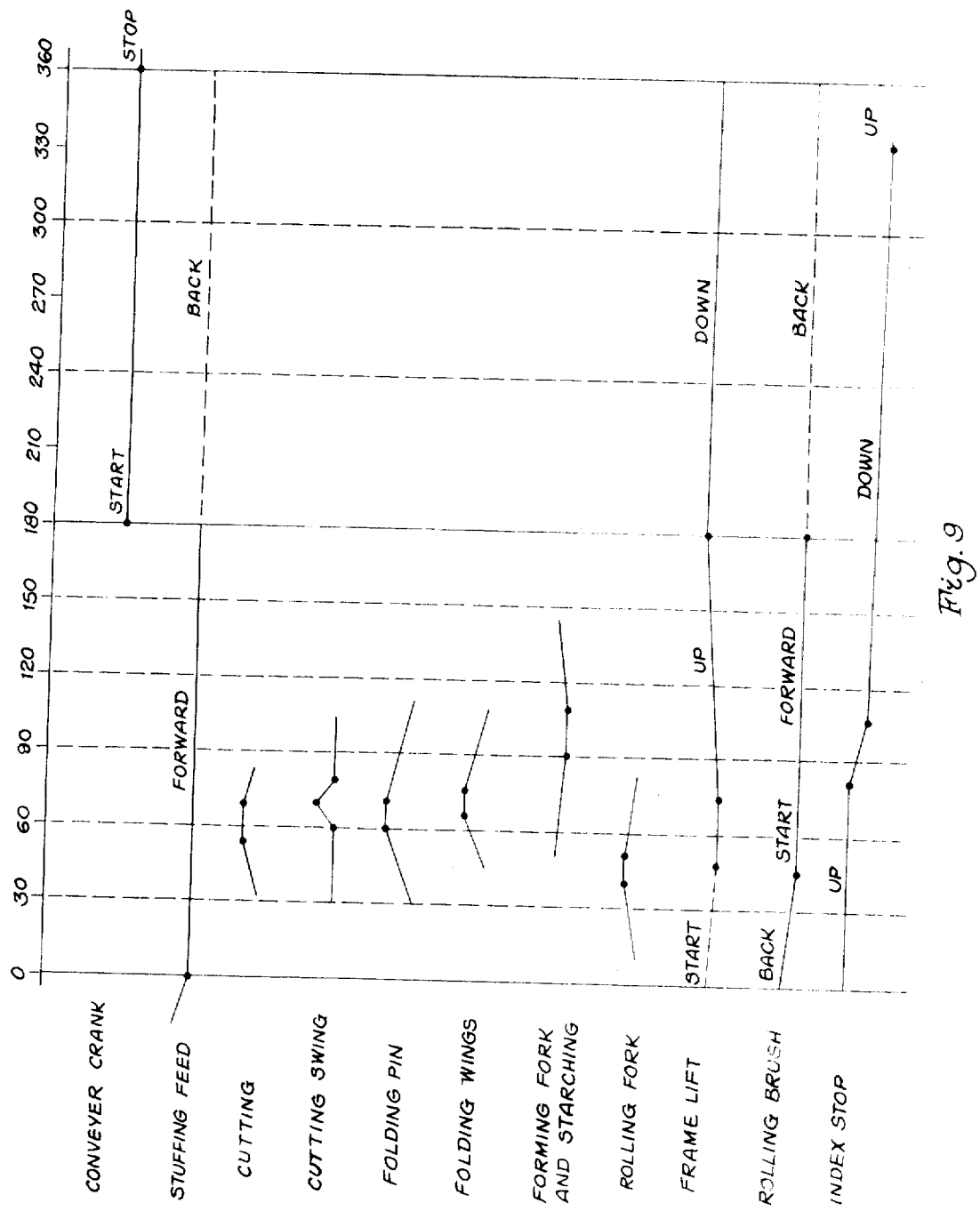
FIG. 9 is a time table for each process in making egg roll.

FIG. 9 shows the sequence of steps in the operation of the stations B to F. The intermittent movement of the conveyor and the operation of the various stations is performed by suitable gearing in cams beneath the conveyor 16 which are driven by one or more motors M and which are conventional drives which do not need to be shown in detail.

Figure 10:
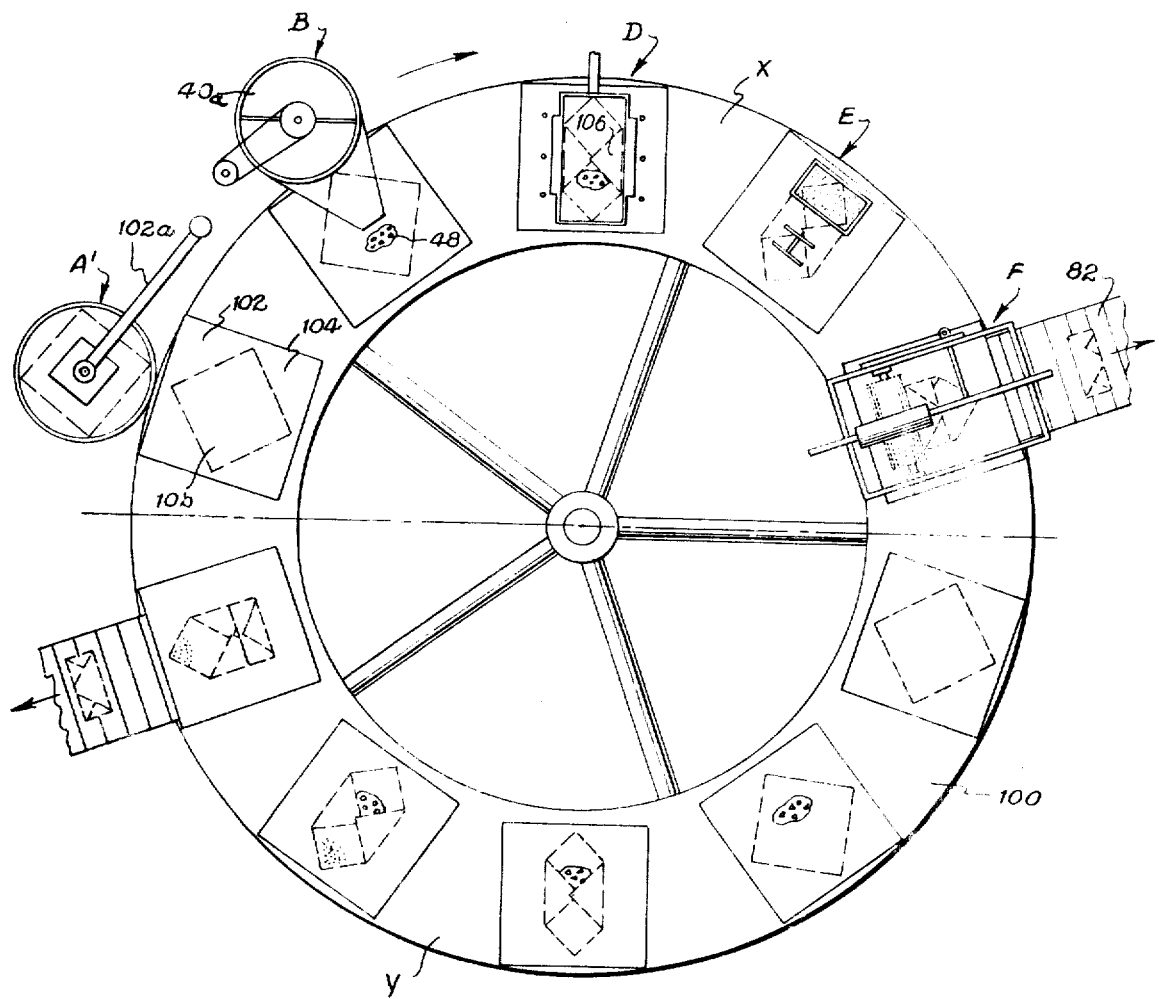
FIG. 10 is a schematic plan view of a modified form of this invention employing an annular turntable as the dough conveyor.

In the modification of FIG. 10, the endless conveyor 16 of FIG. 1 has been replaced by horizontal rotatable annular table 100. Station A of FIG. 1 has been replaced by a magazine A' which contains precut square sheets of dough which may be bought in the noodles market. Station B is the same as in FIG. 1. Station C has been eliminated as the dough sections have been precut. Stations D, E, and F are the same as in FIG. 1. The flexible pads 22 of FIG. 1 have been replaced by individual square sections 102 of flexible rubber fastened to the surface of the annular table. Conventional drives are used for the intermittent rotary movement of the table and the operation of the various stations. At station A', a square sheet of dough 10b is pneumatically lifted from a magazine and taken by an arm 102a and deposited upon its rubber pad 104. At station B, egg roll stuffing portion 48 is deposited on the dough section. Station D operates as in FIG. 1 with the opposite corner portions 106 being folded over the dough section. Station E operates as in FIG. 1 for shaping the stuffing and depositing starch on the dough master. Station F operates as in FIG. 1.

The modification of FIG. 10 has the advantages in that the expense of forming the endless conveyor of FIG. 1 is avoided, and further that one egg roll can be formed on one-half X of the annular table and simultaneously a second egg roll formed on the other half Y of the table, thus producing two egg rolls upon one revolution of the table. The sequence of operations is as in FIG. 9.

Having now described the means by which the objects of this invention are obtained,

I claim:

1. An automatic egg roll making machine comprising intermittently moving belt means, dough supply means for placing a thin continuous dough sheet on said belt means, hopper means for depositing egg roll stuffing on said dough sheet, cutting means for cutting egg roll dough sheet sections with said stuffing thereon from said dough sheet, folding means for folding two side edges of each cut station over said stuffing and making an elongated egg roll master, forming fork means for shaping the stuffing portion of said master into form for rolling, and rolling means for rolling said master into final egg roll form.

2. A machine as in claim 1 in which said belt means comprises a flexible belt composed of a plurality of rubber pads with each three pads forming a set.

3. A machine as in claim 2, said pads each being fastened to and partially separable from a metal plate, and each plate being fastened to a conveyor chain.

4. A machine as in claim 3, the pads of each set comprising a center member and two side members with the outer portion of each side member forming a side flap liftable from its respective plate, end flaps on said side members separable from the plates at the corners adjacent said center member, and said center member having a flap adjacent said end flaps.

5. A machine as in claim 1, said hopper means comprising a hopper having a bottom stuffing outlet end, a screw conveyor in said hopper for pushing stuffing downward, and a starwheel valve at said outlet end for depositing an equal amount of stuffing on said dough sheet between each intermittent movement of said belt means.

6. A machine as in claim 1, said cutting means comprising elongated knife means movable both vertically and lengthwise for cutting said dough sheet.

7. A machine as in claim 1, said folding means comprising folding pin means to lift the two side edges of each cut section, and folding wing means for further folding the lifted side edges to form said egg roll master.

8. A machine as in claim 1, said fork means comprising a pair of spaced horizontal rods connected by a U-shaped member, and means for depositing starch on said master.

9. A machine as in claim 1, said rolling means comprising prong means for lifting an end of said master with said stuffing thereon into position for rolling said master, and rotatable brush means for engaging said end and rolling said master into final egg roll form.

10. A machine as in claim 9, further comprising holding arm means for contacting said master to keep it from slipping while being rolled.

11. An egg roll making machine comprising intermittently moving conveyor means, flexible pad means on said conveyor means, dough supply means for placing a thin sheet of dough on said pad means, hopper means for depositing egg roll stuffing on said dough sheet, folding means turning said pad means to fold end portions of said dough sheet over said dough sheet, forming fork means for shaping the stuffing into form for rolling, and rolling means for rolling said dough sheet around said stuffing into final egg roll form.

* * * * *